A. F. JOBKE.
COPYING CAMERA.
APPLICATION FILED MAY 8, 1919.

1,344,896.

Patented June 29, 1920.
2 SHEETS—SHEET 1.

INVENTOR.
August F. Jobke

UNITED STATES PATENT OFFICE.

AUGUST F. JOBKE, OF DETROIT, MICHIGAN.

COPYING-CAMERA.

1,344,896.

Specification of Letters Patent. Patented June 29, 1920.

Application filed May 8, 1919. Serial No. 295,534.

*To all whom it may concern:*

Be it known that I, AUGUST F. JOBKE, a citizen of the United States, residing at Detroit, Wayne county, in the State of Michigan, have invented certain new and useful Improvements in Copying-Cameras, of which the following is a specification.

My invention relates particularly to photographic apparatus useful in the reproduction of graphic records, as required in the various branches of engineering,—for example, prints from tracings on linen or transparent paper in the same size or on a reduced scale, and its purpose is the provision of continuous operation, so as to make full use of the light provided and to produce a larger output during the same length of time than other arrangements could make possible. The continuous operation enables also the production of copies of unlimited length, thereby avoiding the cumbersome joining together with adhesive of the limited lengths of pieces, as is the practice now where long plans of buildings or industrial plants and the like, are to be reproduced. A similar advantage will also be found in the copying of panoramic films and similar objects.

The operation of this invention is based on the following well known principle in photography: If a camera is sharply focused on a subject moving parallel to the screen, i. e. normal to the principal ray of light, the image produced thereby moves in an opposite direction with a velocity proportionate to the conjugate focal distances. Replacing the screen with a sensitized medium and moving the latter during the exposure with the velocity of the image, renders the same immovable relative to the copying medium, and therefore a full exposure can be accomplished through the continuously traveling image. This enables in a suitable arrangement, to develop and fix the impression on the copying medium in the same succession on one part, while another is still being exposed. The length of the original to be copied is thereby not limited in the direction of the movement and it affects only the time of operation.

Figure 1:
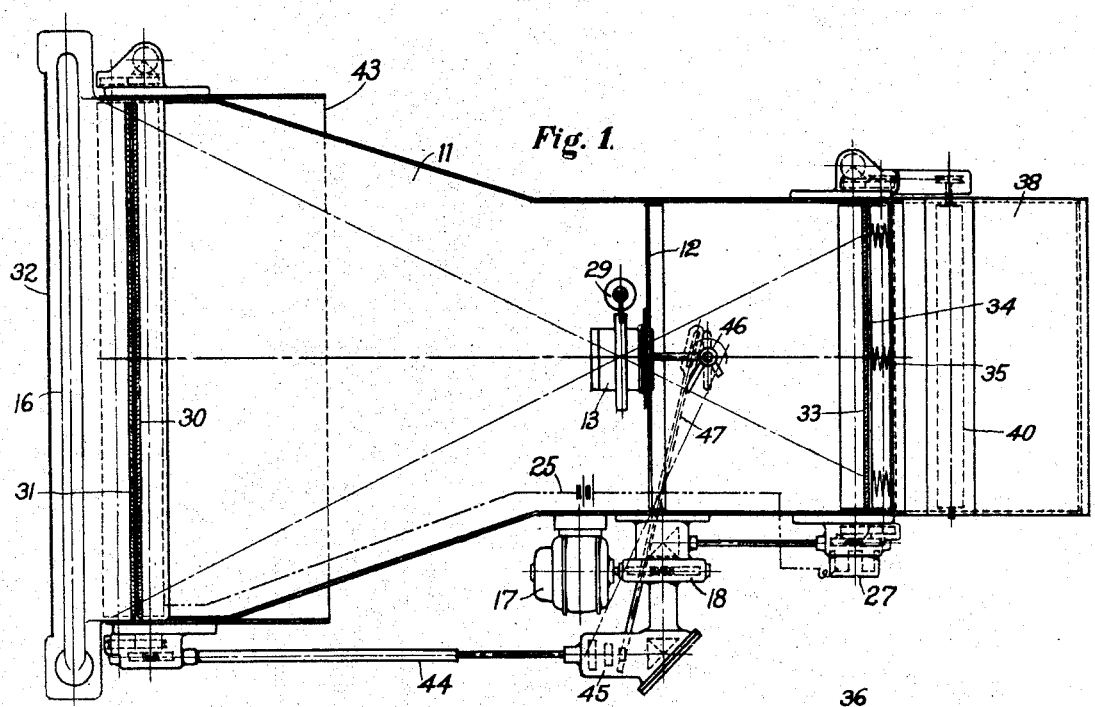
Figure 2:
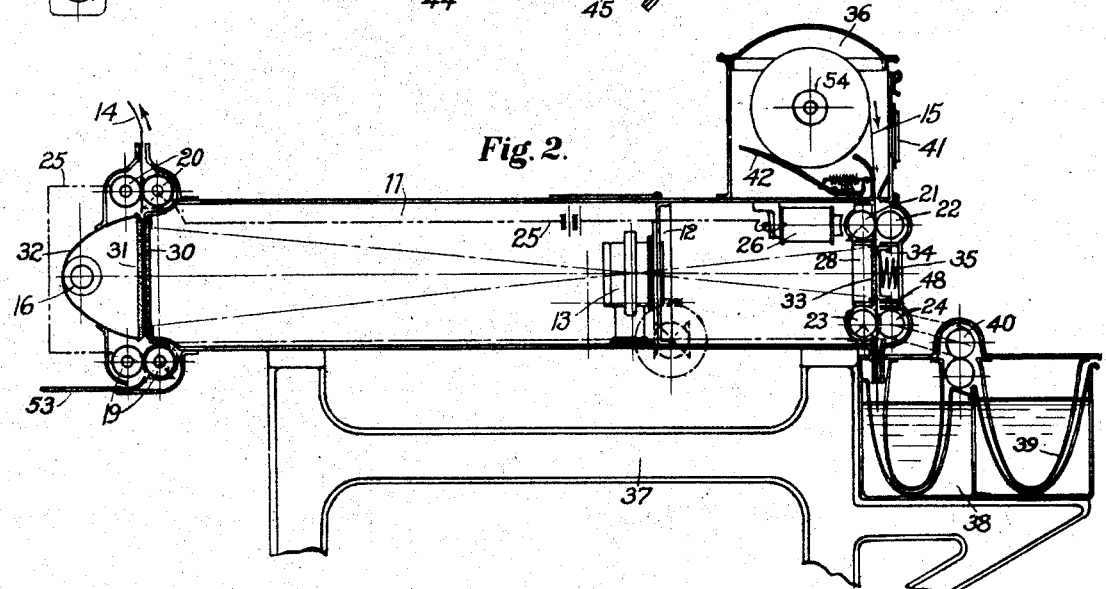
Figure 3:
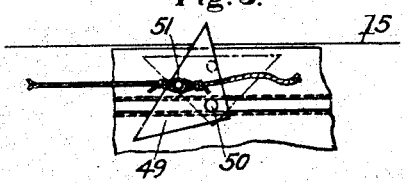
Figure 4:
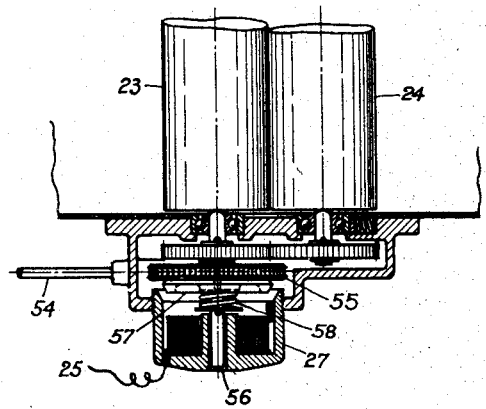
Figure 5:
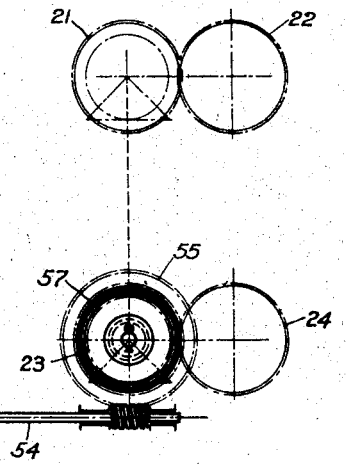
Figure 6:
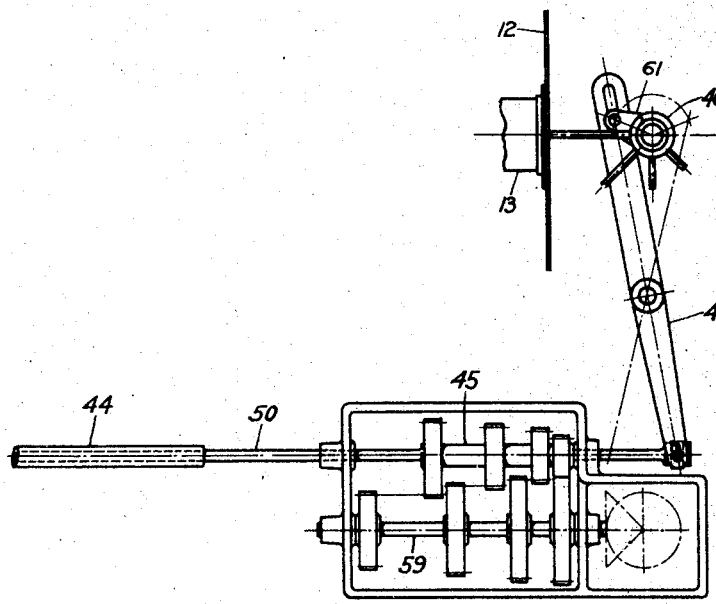

In the accompanying drawings an illustration is given of an arrangement, which embodies the parts and combination of my invention, and Figure 1 therein shows a horizontal section through the apparatus, arranged for the reproduction at various ratios of reduction, while Fig. 2, represents a vertical section through the same, but arranged for one ratio of reduction. Fig. 3 illustrates the arrangement of a cutter of the sensitized medium on which an exposure has been made. Fig. 4 illustrates the arrangement of the drive for the rolls conveying the copying medium, and a magnetic clutch to disengage the rolls from the moving drive, while Fig. 5 shows an axial view of the conical clutch-disk and diagrammatically a worm and gear drive to operate the four rolls simultaneously. Fig. 6 shows in detail the connecting apparatus between a change-gear drive and the stops determining the position of the lens-board, to enable different ratios of reduction.

A dark chamber or camera (11) is partitioned, light-proof, in two parts by a lens-board (12) in whose center a photographic lens (13) preferably an anastigmat of large aperture is mounted. The optical center of this lens is located between the planes of contact of two sets of friction rolls on each end of the camera (11) so that their distances from the lens have the ratio of conjugate focal distances for a predetermined factor of reduction, either to the same size or one differing therefrom. A transparent drawing (14) moving in the direction of the arrow in front of a light source (16) will therefore produce a stationary image on the sensitive paper (15), traveling in the direction of the indicating arrow. A motor (17) connected to the source which also furnishes the light, drives through a worm and gearing train (18) the two sets of friction rolls at their proper speeds. The pair of friction rolls (19) driven direct from the gear train (18) is supposed to have a tight grip on the drawing to be fed from the guide (53) into the machine, while the second pair (20) may have an elastic grip on the same, permitting a slip at a certain tension. With a gear ratio of one tooth higher at 20 than at 19, the drawing will always be straight and passing the light under a certain tension. A similar arrangement may be made with the rolls 21 to 24, inclusive, the rolls 23 and 24 having the lesser grip and the higher speed.

While with this arrangement a slip takes place between the one set of rolls and the passing medium, a slip can also be produced in a small friction clutch interposed between the friction rolls and their driving gears.

This arrangement may be found preferable since it does not impose any wear on the drawings to be copied.

In order not to waste any of the sensitive paper (15), I have arranged to control its feed through the tracing (14), since the operator may forget or not be able to oversee the control of the feed. I accomplish this by mounting the rollers 21 and 23 in a frame (28) which is slightly movable, so that the friction on the paper (15) can be removed and the latter come to a standstill with turning rolls. The control of the necessary movement is obtained with an electromagnet (26) which is in series connected with the rolls 19 and 20 in a circuit (25), either fed from the main circuit furnishing all the power, or, preferably, from a few battery cells having a low voltage, thereby avoiding the dangers of grounding or high voltage across the thickness of the tracing (14). This circuit can be operated with the main switch. It can be seen now, that when there is no tracing in the sets of rolls 19 or 20, the circuit through the magnet (26) is closed; therefore, rolls 21 and 23 do not propel the paper (15). But after a tracing has entered rolls (19) or is passing across rolls 20, the circuit is interrupted and rolls 21 and 23 exert their pressure upon paper (15) and move it along.

The arrangement with electromagnet (26) is one of several to be used, and I therefore would not restrict myself to the same. Another alternative would be to arrange a pot-magnet (27) as in Fig. 1, in connection with a positive or a friction clutch to release the same and thereby prevent the rollers 21 to 24 inclusive, from turning, when the circuit through the magnet is closed. This arrangement is shown in more detail in Fig. 4, where a worm on shaft (54) transmits its motion from the driving gear to a worm-gear (55), running loosely on the roller-shaft (56), which preferably extends through the pot-magnet (27) frictionless, in order to prevent an axial magnetic pull on the same. (57) is a magnetic friction-cone disk, which fits into a recess of the same angularity in the worm-gear and slides on a key in the shaft (56). A spring (58) keeps the friction-disk and worm-gear engaged, as long as the outer pole of the electromagnet (27) does not pull the rim of the former out of contact. Therefore the drive engages the combined train of gears in Fig. 5, to move rolls (21) to (24) inclusive and thereby propel the sensitized paper with the proper speed. Fig. 5 shows the friction-disk (57) in a plane view, and diagrammatically its connection with the worm gear, and also the connection of the four rollers (21) to (24) through miter-gears. In order to keep the circuit through the rolls 19 and 20 insulated, the latter may be made of insulating material such as wood and covered by a metallic shell, as the contact medium.

For the purpose of omitting part of the reproduction, as in the case of a change being desired, an electromagnet (29) may be arranged to operate a shutter in the lens of the bulb-exposure type at the will of the operator. This will prevent the passage of light for the exposure as desired.

In order to positively guide the tracing, there are provided a clear glass plate (30) and another one, preferably matte (31), with such a distance between them, that the tracing will glide in a straight plane, but without undue friction, until taken up by the rollers (20). Their width will correspond to that of a reflector (32) so that a maximum of light passes through them.

Similarly, a clear glass plate (33) and preferably, a reflecting plate (34) of polished metal or white material, are arranged on the copying side to guide the sensitive paper (15) in a straight plane and in the exact focal distance. Springs (35) with a slight pressure may press the plate (34), and therewith the paper in its exact position. Since through a copying paper with white stock some of the light may pass, a reflector will re-direct the same and have some additional chemical action on the under side of the sensitive coating, therefore the total chemical action will be increased.

In order to accomplish a continuous process for the finishing of the reproduction, the following arrangement will now be described: The sensitive paper (15) is contained in a light-proof box (36) and with proper guides is directed through the sets of rollers 21 to 24, inclusive, between which it will have received the exposure of the drawing 14. The body of the camera is light-proof connected to the tanks (38) necessary for a continuous development and fixing, which are mounted with the camera on a common support (37). Wire guides (39) are provided, to positively guide the paper while in the solutions and to prevent the paper from sticking to the walls of the tanks through adhesion or suction. A set of rollers (40) driven from friction roller 24, serves at the same time as a propeller and a wringer, to prevent the carrying over of solution in another tank.

A drier, provided in the customary way, will complete the arrangement for the production of a complete train of finished copies on a continuous strip of copying paper.

While at 41 a window with red or orange glass is provided to permit the inspection of the copying paper, a lever (42) under the action of a spring, is arranged in a circuit adapted to disconnect the power supply, as soon as this lever, after the complete unrolling of the paper supply, touches the metal shell (54) of its supporting mandrel. Therefore, after the exhaustion of the paper, the machine comes to rest.

In referring now to Fig. 1, I shall describe the arrangement, which enables the production of copies at diffeernt rates of reduction.

43 denotes an open box, telescoping light-proof into the open end of the chamber 11 and carrying the guides and propelling rollers as also the light source with its reflector. Proper marks may determine the exact positions of this box to be selected to give the focal distances from the lens to the drawings to be copied. The drive shaft (44) for the roller train (19) and (20) is made telescoping on a key or spline to provide a positive drive for any position. A change gear (45) provides for the variation of speed as is required for the different ratios of reduction, while a variation of field excitation of the motor provides for speeding up of the complete drive for a higher reduction.

For the purpose of varying reduction, a shifting of the lens-carrier (12) must be provided, and I arrange the stop (46) with pegs of different lengths at different angles, as the equivalent of a cam, to limit the movement of the lens-carrier after the selected position has been obtained. A lever (47) connecting a crank at 46 with the shaft operating the change gear (45) accomplishes the selection of lens portion and corresponding speed ratio in one operation. For the convenience of illustration Fig. 6 shows the change-gear case turned 90° around shaft (44), and (59) denotes a rigidly held gear-shaft carrying a number of spur-gears, corresponding to the required number of reductions, while (45) is a set of corresponding gears on an axially sliding shaft (60). All spur-gears are spaced so that a movement for the face-width plus the necessary clearance brings another pair of gears into mesh. The lever (47) by means of collars and sliding ring, takes a corresponding angular position, which in turn, at the other end, corresponds to a different angular position of the crank 61, rigidly connected with the lens stop (46). The turning of this crank provides for the change of angular position of lever (47) and, therefore, the simultaneous adjustment of lens-stop and change-gear.

At 48 a cutter-arrangement is indicated, which permits cutting off the exposed stock, if the machine is to discontinue operation, and in Fig. 3 an arrangement is shown in a plane view from above, which may serve as an illustration of the same.

A triangular knife (49) swings around a trunnion (50), which glides in grooves serving as guides. A pin (51) preferably also guided, takes up the pull of one of the two attached strings, pulling in opposite directions. The resistance of the paper (15) against cutting and the pressure of the trunnion against the groove place the cutting edge into the right position to cut in the direction of the pulling string. When there is no pull exerted, the blade should be made to take the position as shown in dot and dash, which can simply be taken care of by a leaf-spring. Thus the cutting will be done alternately from the right and left.

Having thus described my invention, what I claim and desire to secure by Letters Patent, is:—

1. In a photographic apparatus a dark chamber with openings at the two ends for the admission and passage of light, two pairs of friction rollers at each end placed in parallel planes of contact at conjugate focal distances, a lens and lens board separating the said chamber into two light-proof compartments and means, including an electric circuit through the two pairs of friction rollers propelling the medium to be copied, to control the feed by the set of friction rollers propelling the sensitive copying medium.

2. In a photographic apparatus a dark chamber with openings at the two ends for the admission and passage of light, two pairs of friction rollers at each end placed in parallel planes of contact at conjugate focal distances, a lens and lens board separating the said chamber into two light-proof compartments and means, including an electro-magnet and its circuit through the two pairs of friction-rollers propelling the medium to be copied, to control the feed by the set of friction rollers propelling the sensitive copying medium, the feed being established through the interposition of the medium to be copied between one of the corresponding pairs of friction rollers causing the release of the electromagnet.

3. In a photographic apparatus a dark chamber with openings at the two ends for the admission and passage of light, two pairs of friction rollers at each end placed in parallel planes of contact at conjugate focal distances, a lens and lens board separating the said chamber into two light-proof compartments, a friction clutch in the drive of the set of friction rollers propelling the copying medium, and means, including an electro-magnet and its circuit through the two pairs of friction rollers propelling the medium to be copied, controlling the friction clutch.

4. In a photographic apparatus a dark chamber with openings at the two ends for the admission and passage of light, two pairs of friction rollers at each end placed in parallel planes of contact at conjugate focal distances, a lens and lens board separating the said chamber into two light-proof compartments, a friction clutch in the drive of the set of friction rollers feeding the copying medium, and means, including an electromagnet and its circuit through the two pairs of friction rollers propelling the medium to be copied, to control the said friction clutch, the feed of the copying medium being established through the interposition of the medium to be copied between one of the corresponding pairs of friction rollers.

5. In a photographic apparatus a dark chamber with two pairs of friction rollers at each end placed in parallel planes of contact, a lens board and lens adapted to separate the chamber into two light-proof compartments, providing conjugate focal distances between the said planes and a pair of guide plates placed at one end resiliently in contact with each other in one of the said planes, the guide plate nearer the lens being of transparent material and the guide plate on the outward side having a reflecting surface toward the said lens.

6. In a photographic apparatus a dark chamber with two pairs of friction rollers at each end, placed in parallel planes of contact and rotating in opposite directions, openings in the chamber between each two pairs of friction rollers for the admission and passage of light, the second pair of rollers in the direction of rotation rotating faster than the first pair and providing for less friction.

7. In a photographic apparatus a dark chamber with a movable extention at one end and two pairs of friction rollers at the end of the extension and at the opposite end of the chamber, placed in parallel planes of contact, openings in the chamber and its extension between the two pairs of rollers for the admission and passage of light, a movable lens board and lens adapted to establish variable conjugate focal distances between the said parallel planes and a mechanical drive adapted to vary the speed ratio of the two sets of friction rollers in the ratio of the adjacent conjugate focal distances.

8. In a photographic apparatus a dark chamber with a movable extension at one end and two pairs of friction rollers at the end of the extension and at the opposite end of the chamber, placed in parallel planes of contact, openings in the chamber and its extension between each two pairs of friction rollers for the admission and passage of light, a movable lens board and lens adapted to establish pre-determined variable conjugate focal distances between the said parallel planes, means to stop the said lens board in its pre-determined position, and a mechanical drive provided with a change gear arrangement to vary the speed ratio of the two sets of friction rollers in the ratio of the adjacent conjugate focal distances.

9. In a photographic apparatus a dark chamber with a movable extension at one end and two pairs of friction rollers at the end of the extension and at the opposite end of the chamber, placed in parallel planes of contact, openings in the chamber and its extension between each two pairs of friction rollers for the admission and passage of light, a movable lens board and lens adapted to establish pre-determined variable conjugate focal distances between the said parallel planes, means to arrest the said lens board in its pre-determined position, including stops of corresponding lengths rotatable radially about a central bearing, a mechanical drive provided with a change gear arrangement to vary the speed ratio with respective conjugate focal distances, and means, including a lever, for simultaneously adjusting the roller speeds and lens positions.

10. In a photographic apparatus a dark chamber with a movable extension at one end and two pairs of friction rollers at the end of the extension and at the opposite end of the chamber, placed in parallel planes of contact, openings in the chamber and its extension between each two pairs of friction rollers for the admission and passage of light, a movable lens board and lens adapted to establish predetermined variable conjugate focal distances between the said parallel planes, means to arrest the said lens board in its predetermined position, including stops of corresponding lengths rotatable radially about a central bearing, a mechanical drive provided with a change-gear arrangement to vary the speed ratio with the respective conjugate focal distances, means, including a lever, for simultaneously adjusting the roller speeds and lens positions, means, including an electromagnet and its circuit through the two pairs of friction rollers at the said movable extension, and a friction-clutch in the drive of the friction rollers at the said dark chamber, released by the said electromagnet through the interposition of a medium to be copied between the corresponding friction rollers.

In testimony whereof, I affix my signature this sixth day of May, 1919.

AUGUST F. JOBKE.